United States Patent [19]
Lisowsky

[11] Patent Number: 5,390,414
[45] Date of Patent: Feb. 21, 1995

[54] GEAR MAKING PROCESS

[75] Inventor: Bohdan Lisowsky, Troy, Mich.

[73] Assignee: Eaton Corporation, Cleveland, Ohio

[21] Appl. No.: 43,359

[22] Filed: Apr. 6, 1993

[51] Int. Cl.[6] ............................................. F16H 55/17
[52] U.S. Cl. ............................. 29/893.34; 29/893.37; 74/458
[58] Field of Search ............. 29/893.3, 893.31, 893.34, 29/893.36, 893.37; 419/38, 48, 49, 68; 74/458; 427/191, 197

[56] References Cited

U.S. PATENT DOCUMENTS

| | | | |
|---|---|---|---|
| 3,394,432 | 7/1968 | Laurent . | |
| 3,398,444 | 8/1968 | Nemy . | |
| 3,752,003 | 8/1973 | Dunn et al. . | |
| 3,842,646 | 10/1974 | Kuhn . | |
| 3,891,367 | 6/1975 | Signora . | |
| 4,050,283 | 9/1977 | Schober | 72/344 |
| 4,470,953 | 9/1984 | Bruce . | |
| 4,554,218 | 11/1985 | Gardner | 428/567 |
| 4,585,619 | 4/1986 | Westin . | |
| 4,593,776 | 6/1986 | Salesky | 175/375 |
| 4,708,912 | 11/1987 | Huppmann . | |
| 4,710,345 | 12/1987 | Doi et al. . | |
| 4,885,831 | 12/1989 | Fett . | |

FOREIGN PATENT DOCUMENTS 48212 12/1982 Japan .

Primary Examiner—Mark Rosenbaum
Assistant Examiner—Khan Nguyen
Attorney, Agent, or Firm—Brooks & Kushman

[57] ABSTRACT

Method of manufacturing a helical gear allowing strategic placement of a hardenable wear-resistant and high strength layer at predetermined locations on the gear. The method includes the steps of forming a gear core preform having the general shape of the helical gear and positioning the gear core preform within an elastomeric mold having the specific shape of the helical gear. The method also includes the steps of filling the mold at the predetermined locations with the hardenable metallurgical material and densifying the gear core preform and the metallurgical material. Lastly, the method also includes the step of heat treating the densified gear core preform and metallurgical material, to obtain the helical gear having a wear-resistant layer at the predetermined locations. A helical gear formed according to method is also provided.

24 Claims, 2 Drawing Sheets

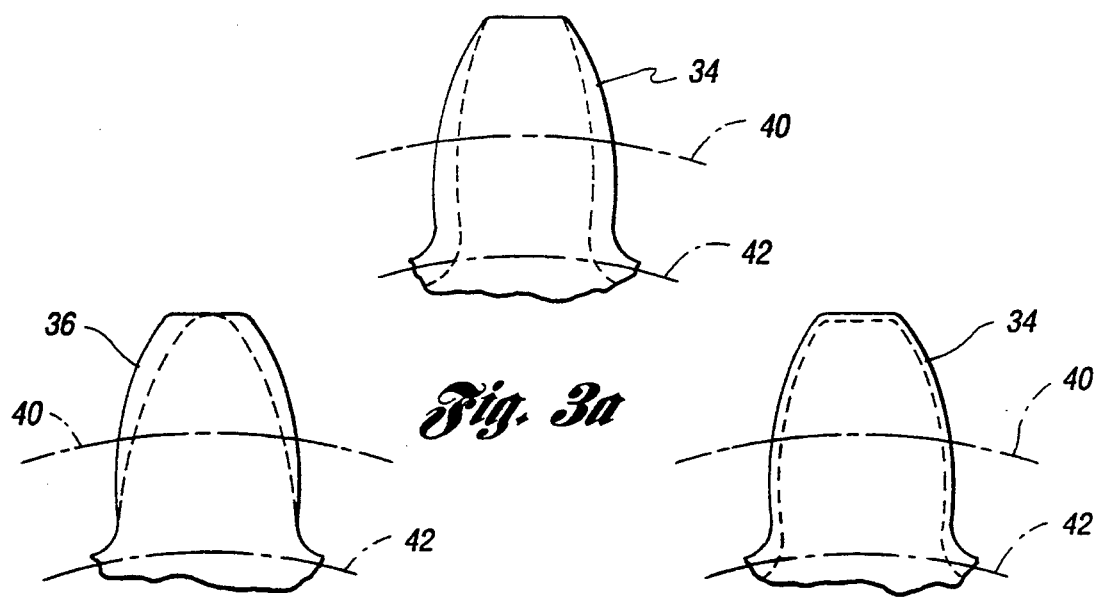
Fig. 3a
Fig. 3b  Fig. 3c
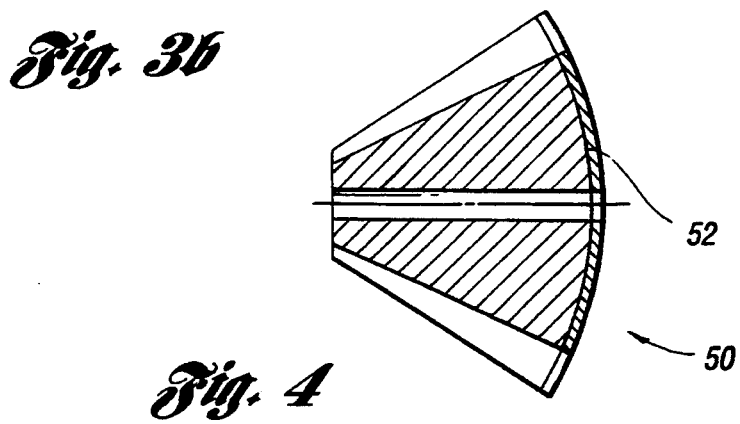
Fig. 4
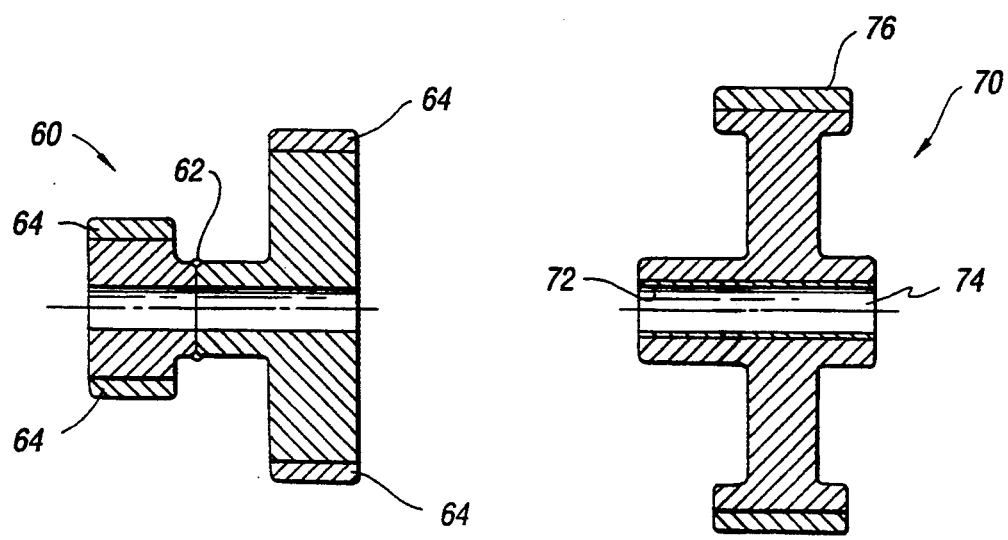
Fig. 5  Fig. 6

GEAR MAKING PROCESS

TECHNICAL FIELD

The present invention relates to the manufacture of gears and, more particularly, to a method for manufacturing fully dense, powdered metal gears, especially helical gears.

BACKGROUND ART

Many methods of making gears are known in the art. For example, one method involves the use of mechanical or isostatic pressing to compact powdered metal into a gear shape having a desired density. The powdered metal gear shape is then heat treated or sintered to impart certain characteristics, such as improved hardness, to the gear. Finally, the gear can be forged with known forging equipment to further increase density. Gear manufacture processes such as this are described in U.S. Pat. Nos. 3,394,432, 3,842,646, 3,891,367, 4,470,953, 4,585,619 and 4,710,345. U.S. Pat. No. 4,708,912 discloses a gear manufacturing process which utilizes a blank instead of powdered metal, and U. S. Pat. No. 3,752,003 discloses a method of making a composite gear. Conventional methods exist to modify the above-described gear manufacturing processes to obtain gears with hardened surfaces, as disclosed in U.S. Pat. Nos. 3,398,444 and 4,885,831 .

Certain gear shapes, such as helical gear shapes, present problems that render production of such gears by the conventional processes described above very difficult and very costly. It would be desirable to develop a process for manufacturing these gear shapes which would allow for the use of certain composite materials which would produce the desired response to rapid heat treatment, such as by induction.

It would also be desirable that the composite materials at the same time possess the needed properties of hardness and residual stress profile for superior performance in bending and contact fatigue. Still further, it would be desirable to develop a method of gear manufacture which allows for the placement of special wear resistant layers at specified points on the gear.

DISCLOSURE OF THE INVENTION

It is therefore an object of the present invention to provide a method of manufacturing a gear which allows for the placement of a special wear resistant layer at specified points on the gear.

It is also an object of the present invention to provide a method of manufacturing a gear which allows for the use of certain composite materials which would produce the desired response to rapid heat treatment, such as by induction.

It is yet a further object of the present invention to provide a method of manufacturing a gear which allows for the use of composite materials which possess the needed properties of hardness and residual stress profile for superior performance in bending and contact fatigue.

In carrying out the above objects, and other objects and features of the present invention, there is provided a method of manufacturing a gear comprising forming a gear core preform having the general geometry of the gear and applying hardenable metallurgical material to the gear core preform at predetermined locations. The method also comprises hardening the metallurgical material on the gear core preform, to obtain the gear having a wear-resistant layer at the predetermined locations.

In a preferred embodiment, the step of applying the hardenable metallurgical material comprises positioning the gear core preform within an elastomeric mold having the shape of the gear, and filling the mold at the predetermined locations with the hardenable metallurgical material. The step of hardening the metallurgical material comprises densifying the gear core preform and metallurgical material, and heat treating the densified gear core preform and metallurgical material.

The advantages accruing to the present invention are numerous. For example, by allowing for the placement of a special wear resistant layer at specified points on the gear, the present invention satisfies many gearing applications which require areas, in addition to the gear teeth, which need to be wear resistant.

The above objects and other objects, features, and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIG. 3a is a side view of a gear tooth shown in phantom, illustrating a first preferred placement of a hardenable metallurgical layer around the tooth to resist bending fatigue;

FIG. 3b is a side view of a gear tooth shown in phantom, illustrating a second preferred placement of a hardenable metallurgical layer around the tooth to resist pitting fatigue;

FIG. 3c is a side view of a gear tooth shown in phantom, illustrating a third preferred placement of a hardenable metallurgical layer around the tooth to resist both bending and pitting fatigue;

FIG. 4 is a cross-section of a differential pinion/side bevel gear illustrating a placement of a hardenable metallurgical layer thereon for wear resistance;

FIG. 5 is a cross-section of a welded gear cluster illustrating placement of a hardenable metallurgical layer, avoiding areas to be welded; and FIG. 6 is a cross-section of another welded gear cluster illustrating placement of a hardenable metallurgical layer within a bore.

BEST MODE FOR CARRYING OUT THE INVENTION

Figure 1:
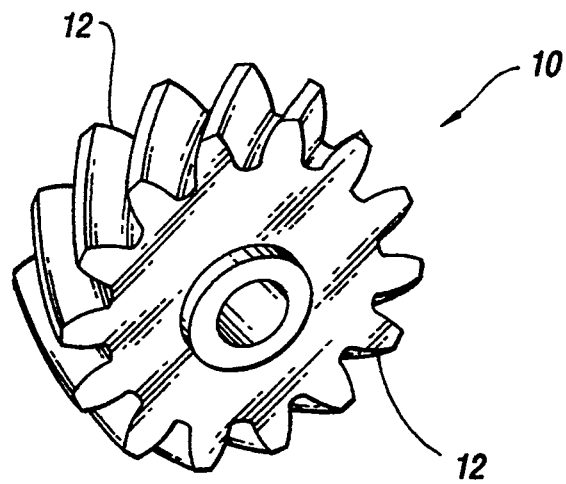
FIG. 1 is a perspective view of a typical helical gear.

Referring now to FIG. 1, there is shown a perspective view of a helical gear, shown generally by reference numeral 10, manufactured according to the method of the present invention. Such gears are well known in the art, having a plurality of teeth 12 each having a tooth profile that is nominally constant from end to end. As is known, the teeth 12 are of a helical form and produce end thrust under loading.

Figure 2:
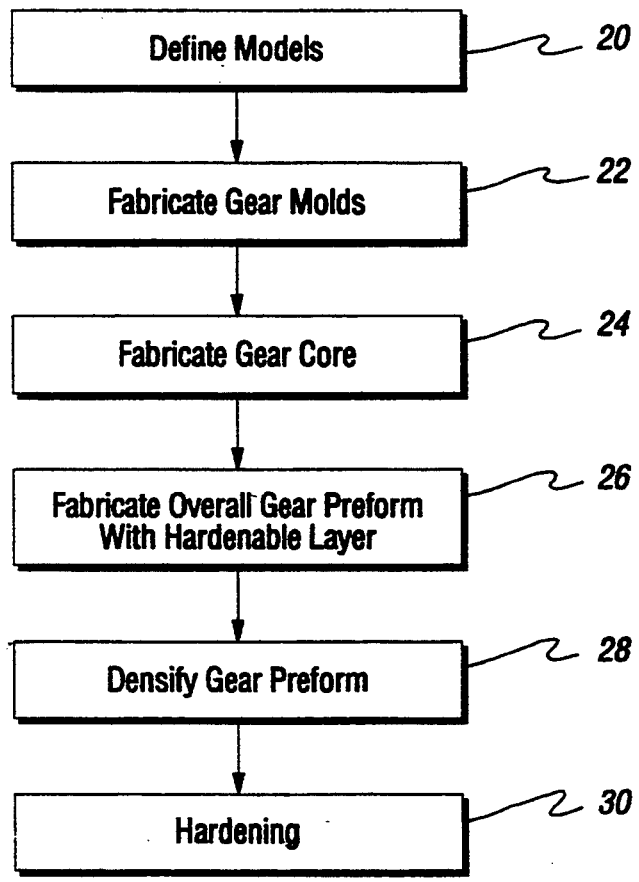
FIG. 2 is a flow chart detailing the method of the present invention for forming gears, such as the helical gear shown in FIG. 1.

With reference now to FIG. 2, there is illustrated a flow chart detailing the method of forming gears, such as the helical gear 10 shown in FIG. 1, of the present invention. As shown, at step 20 at least two models of the gear are fabricated. Preferably, these gear models account for all subsequent dimensional shrinkages of the powdered metal due to, for example, isostatic pressing and/or full densification of the powdered metal preform, as described in greater detail below. The goal is to produce a composite structure having a lower carbon core and higher carbon heat treatable layers. Thus, one model defines the lower carbon core, and the other model defines and includes the higher carbon heat treatable areas as well. In the preferred embodiment, the models closely resemble the intended gear and can be formed utilizing a number of materials, such as wood, aluminum, brass or steel, just to name a few. Generally, models are fabricated of wood, aluminum or brass for lower volume gear production, whereas models are fabricated of steel for higher volume gear production. Regardless of material, the models usually start out slightly larger than necessary so that the desired final gear geometry is produced in gears.

With continuing reference to FIG. 2, at step 22 the gear molds are fabricated based on the models defined at step 20. A primary elastomeric mold is fabricated to form the gear core, and a separate secondary elastomeric mold is fabricated to form the overall gear. The primary mold includes the general geometry of the intended gear, i.e., in the case of the helical gear 10, the mold would include the general helical tooth form. The secondary mold is preferably shaped to include the specific geometry of the intended gear, and allows an additional layer of material to be added to the gear core, as described in greater detail below.

In the preferred embodiment, the primary mold is intended for use with cold isostatic pressing at step 24 to obtain a powdered metal gear core preform. During this step, the primary mold is filled with a powdered metal material. To form the gear core, a low carbon heat treatable powdered steel, such as SAE 8620 or SAE 4120, is utilized. The powdered metal can have fugitive binders, such as waxes or ethylene glycol, to facilitate powder pressing and generate the desired "green" strength of the gear core preform. The powdered metal filled elastomeric mold is then squeezed at a very high pressure, compacting the powdered metal in the mold into a handleable gear core preform, which thus takes shape of the general geometry of the intended gear.

As shown in FIG. 2, once the gear core preform is formed by cold isostatic pressing, the overall gear preform with a hardenable layer is formed at step 26. The gear core preform formed at step 24 is removed from the primary mold and positioned or located within the secondary elastomeric mold. A higher carbon powdered metal, such as SAE 8680 or SAE 8690 composition, is then added to the secondary mold around the gear core preform at predetermined locations, i.e. those locations where increased hardness may be required. Once the secondary mold is filled with this hardenable layer of high carbon powdered metal, the filled mold is then cold isostatically squeezed at a very high pressure, compacting the high carbon powdered metal around the gear core into the specific geometry of the intended gear, resulting in a helical gear which has a layered structure. It should be appreciated that this methodology allows for strategic placement of the hardenable layer in specific areas, as described in greater detail below.

The overall gear preform is compacted further at step 28 to obtain a high strength gear. Preferably, step 28 is carried out utilizing hot isostatic pressing, or a combination of sintering, followed by hot isostatic pressing, to obtain near 100% density for strength and response to heat treatment. Any one of the known types of hot isostatic pressing can be used, such as the Ceracon process, which has a lower cost than others.

Heat treatment of the densified gear preform is performed at step 30. Preferably, the heat treatment is done by rapid induction heating followed by rapid quenching. The gear could be quenched and tempered by conventional means. During heat treatment, depending on time and temperature, the carbon may diffuse out and intermix with the core material, resulting in a transitional hardenable layer. After heat treatment, the gear core materials will develop a relatively low hardness, such as about 30-35 Rockwell C, whereas the case material, which has a high carbon content, will develop a hardness of about 55-62 Rockwell C.

Referring now to FIGS. 3a-3c, there are illustrated side views of a gear tooth, shown in phantom, depicting potential placements of the hardenable metallurgical layer of step 26 around the tooth. These figures illustrate to one of ordinary skill the capabilities that can be obtained by judicious selection and placement of hardenable metallurgical materials.

As is known, in conventionally carburized gears, the case depth at the root of the tooth is often less than the depth at the tooth tip. That is normally what happens with the physics and chemistry of the carburizing process. FIGS. 3a-3c illustrate strategic placement of the hardenable layer 34 which is not possible with normal heat treating. FIG. 3a illustrates a thicker layer around the tooth root, whereas FIG. 3b illustrates a layer 36 also having varying thickness, i.e. a heavier layer on the tooth tip and a thinner layer at the root of the tooth. Of course, the situation could be reversed, wherein there is a thick layer at the root of the tooth and a thin layer at the tip, just as there may be locations around the tooth that do not require a hardenable layer. FIG. 3c depicts a desirable balance for both bending and pitting fatigue for long life gears wherein the hardenable layer is thicker at the root line, shown generally by reference numeral 42, than at the pitch line, shown generally by reference numeral 40. The present invention thus provides a degree of flexibility not available with existing methodologies of gear manufacture.

With existing methodologies, the normal situation involves a case that is thinner toward the tooth root and thicker at the tooth tip. This situation results because of the diffusion that takes place. There is a higher flux of carbon diffusion as a function of depth at the tooth tip and lower flux of carbon diffusion as a function of depth at the tooth root area. In addition, if the furnace carburizing atmosphere is not well-circulated, the carbon potential at the tooth root depletes more rapidly, thus slowing the diffusion rate even further.

As best shown in FIG. 3a, gear specification typically includes case depth specification at a pitch line 40 and at a root line 42. Generally, case depth measurements are specified at the pitch line 40 and at the root line 42 perpendicular to the gear surface. Normally, the root line 42 case depth is about 60% of the pitch line 40 case depth. To improve resistance to failures due to bending fatigue, however, it is desirable to have a case depth at the root line 42 that is heavier than the case depth at the pitch line 40. Unfortunately, this desired result is not possible in a conventional gear carburizing process.

Gear formation according to the present invention, however, permits placement of material to obtain any desired pitch line case depth/root line case depth relationship. Thus, to resists failures due to bending fatigue (as best shown in FIG. 3a), step 26 of FIG. 2 would include positioning high carbon powdered metal in the secondary mold around the tooth root to form a hardenable layer 34 having the preferred variable thickness. After isostatic pressing and heat treatment, the hardenable layer 34 provides the gear with a heavier case depth at the tooth root line 42 than at the pitch line 40, as shown in FIG. 3a. The hardened layer 34 around the tooth root line has an associated gradient in the hardness or the strength of that layer 34 compared to the gear core. This would be especially useful for gears that are intended to basically transmit torque.

As best shown in FIG. 3b, when you have gears that are primarily transmitting motion or that experience surface fatigue, the goal is to improve pitting resistance at or near the pitch line 40. Accordingly, step 26 would include positioning high carbon powdered metal in the secondary mold around the pitch line 40, to form a hardenable layer 36 having variable thickness. After isostatic pressing and heat treatment, the gear has a heavier case depth at the pitch line 40 than at the root line 42. The hardened layer 36 around the pitch line has an associated gradient in the hardness or the strength of that layer 36 compared to the gear core.

Referring now to FIG. 4, the present invention is also useful in applications other than gear teeth themselves. FIG. 4 illustrates a differential pinion/bevel gear shown generally by reference numeral 50, including a hardened metallurgical layer, formed according to the present invention. As is known, a differential pinion gear normally requires a wear-resistant washer, because it runs in a soft cast-iron or powdered metal case. Utilizing the present invention, a hardenable wear-resistant layer 52 can be placed on the back of the differential pinion gear 50. After heat treatment, the gear will attain its wear characteristic. Of course, that gear would then need to have the same case profile on the teeth, but with the addition of the wear-resistant layer.

Referring now to FIG. 5, yet another application of the present invention involves the welding of cluster gears, shown generally by reference numeral 60. It is very difficult to produce good welds in high carbon materials, such as a carburized case. Typically, the weld area 62 at the chamfers and hub faces is protected from carburization or removed after heat treatment, so that gears can be joined by welding. Protecting or removing the weld area is an external operation which adds time and cost. With the present invention, at step 26 of FIG. 2 high carbon hardenable layers 64 can be placed where needed while avoiding the weld areas, allowing the weld to be made without any extra operations.

Referring now to FIG. 6, another application of the present invention involves a gear shown generally by reference numeral 70. As shown, the gear 70 can be formed to include a hardenable layer 72 in a bearing bore 74 in addition to the hardenable layer 76 present in the gear teeth. This is of particular use in applications where a rotating or sliding shaft is positioned in the bore 74. The hardenable layer can result in either a smooth bore or a contoured (i.e. splined) bore, to transfer torque from/to the shaft from the gear. Thus, the present invention allows for the strategic placement of a hardenable wear-resistant layer on both outside surfaces (as shown in FIGS. 3a–3c and 4), and inside surfaces, as shown in FIG. 6.

It should be appreciated that the applications discussed above represent only a few of the potential applications and one of ordinary skill in the art will be able to identify many other applications benefitting from the ability to strategically place a high-strength, high wear-resistant layer in a particular area.

It is understood, of course, that while the forms of the invention herein shown and described constitute the preferred embodiments of the invention, they are not intended to illustrate all possible forms thereof. It will also be understood that the words used are words of description rather than limitation, and that various changes may be made without departing from the spirit and scope of the invention as recited by the following claims.

What is claimed is:

1. A method of manufacturing a gear, the method comprising:
    fabricating an elastomeric gear core mold having the shape of the gear core preform;
    fabricating an elastomeric gear perform mold having the shape of the gear;
    filling the gear core mold with a powdered metal material;
    subjecting the gear core mold to high pressure to form the gear core preform;
    applying hardenable metallurgical material to the gear core preform at predetermined locations by positioning the gear core preform within the gear preform mold, filling the gear preform mold at the predetermined locations with the hardenable, metallurgical material, and densifying the gear core preform and the metallurgical material; and
    hardening the hardenable metallurgical material by heat treating the densified gear core preform and metallurgical material, to obtain the gear having a wear-resistant and high strength layer at the predetermined locations.

2. The method of claim 1 wherein the gear is a bevel gear.

3. The method of claim 2 wherein the bevel gear has a front side and a back side, and wherein one of the predetermined locations includes the back side of the gear.

4. The method of claim 1 wherein the gear is a weldable cluster gear, and wherein the predetermined locations do not include those areas of the cluster gear at which a weld will be performed.

5. The method of claim 1 wherein the gear is a helical gear.

6. A method of manufacturing a helical gear, the method comprising:
    fabricating an elastomeric gear core mold having the shape of the gear core preform;
    fabricating an elastomeric gear preform mold having the specific shape of the helical gear;
    filling the gear core mold with a powdered metal material;
    subjecting the gear core mold to high pressure to form the gear core preform;
    positioning the gear core preform within the gear preform mold;
    filling the gear preform mold at the predetermined locations with a hardenable powdered metallurgical material;
    densifying the gear core preform and the hardenable powdered metallurgical material; and
    heat treating the densified gear core preform and the hardenable metallurgical material, to obtain the helical gear having a wear-resistant and high strength layer at the predetermined locations.

7. A method of manufacturing a helical gear, the method comprising:

fabricating at least two models representing the helical gear, the first model representing a gear core, the second model representing the desired geometry of the helical gear;

fabricating a gear core mold from the first model and an elastomeric mold having the specific shape of the helical gear from the second model;

filling the gear core mold with a first powdered metallurgical material so as to form a gear core preform having the general shape of the gear by cold isostatically pressing the gear core mold filled with the first powdered metallurgical material;

positioning the gear core preform within the elastomeric mold;

filling the elastomeric mold at the predetermined locations with a hardenable powdered metallurgical material;

densifying the gear core preform and the hardenable powdered metallurgical material; and heat treating the densified gear core preform and the hardenable metallurgical material, to obtain the helical gear having a wear-resistant and high strength layer at the predetermined locations.

8. The method of claim 7 wherein the step of densifying includes hot isostatically pressing the gear core preform and the hardenable metallurgical material.

9. The method of claim 8 wherein the step of heat treating includes heat treating by induction hardening.

10. The method of claim 8 wherein the step of heat treating includes heat treating by quenching and tempering.

11. A method of manufacturing a helical gear having a desired geometry, the method comprising:

fabricating at least two models representing the helical gear, the first model representing a gear core, the second model representing the desired geometry of the gear;

fabricating a gear core mold and an overall gear mold from the first model and the second model, respectively;

filling the gear core mold with a first powdered metallurgical material so as to form a gear core preform having the general shape of the gear;

positioning the gear core preform within the overall gear mold having the specific shape of the helical gear;

applying a second powdered metallurgical material to the gear core preform at predetermined locations to obtain an overall gear preform having a layered structure at the predetermined locations;

densifying the overall gear preform; and hardening the overall gear preform to obtain the gear with a wear-resistant layer at the predetermined locations.

12. The method of claim 11 wherein the step of applying comprises:

filling the overall gear mold, at predetermined locations, with the second powdered metallurgical material; and pressing the overall gear mold at high pressure to obtain the overall gear preform.

13. The method of claim 12 wherein the gear core preform and overall gear preform are formed by cold isostatically pressing the gear core mold and the overall gear mold, respectively.

14. The method of claim 13 wherein the step of densifying includes hot isostatically pressing the overall gear preform.

15. The method of claim 14 wherein the step of hardening the overall gear preform includes heat treating the overall gear preform by induction heating.

16. The method of claim 12 wherein the predetermined locations include at least one of a pitch line of the gear or a root line of the gear.

17. A helical gear comprising:

(1) a gear core formed by pressing a first powdered metallurgical material in an elastomeric mold, the gear core having the general geometry of the helical gear; and (2) a wear-resistant and high strength layer selectively positioned on the gear core at predetermined locations by (a) applying hardenable metallurgical material to the gear core preform at the predetermined locations;

(b) densifying the gear core preform with the hardenable metallurgical material to obtain an overall gear preform; and (c) hardening the overall gear preform to obtain the gear with a wear-resistant and high-strength layer at the predetermined locations.

18. A helical gear comprising:

(1) a gear core preform formed by (a) fabricating at least two models representing the helical gear, the first model representing a gear core, the second model representing the desired geometry of the gear;

(b) fabricating a gear core mold and an overall gear mold from the first model and the second model, respectively; and (c) filling the gear core mold with a first powdered metallurgical material so as to form the gear core preform having the general shape of the gear; and (2) a wear-resistant and high strength layer selectively positioned on the gear core at predetermined locations by (d) positioning the gear core preform within the overall gear mold having the specific shape of the helical gear;

(e) applying a second powdered metallurgical material to the gear core preform at predetermined locations to obtain an overall gear preform having a layered structure at the predetermined locations;

(f) densifying the overall gear preform; and (g) hardening the overall gear preform to obtain the gear with a wear-resistant layer at the predetermined locations.

19. The helical gear of claim 18 wherein the gear core preform and overall gear preform are formed by cold isostatically pressing the gear core mold and the overall gear mold, respectively.

20. The helical gear of claim 19 wherein the overall gear preform is densified by hot isostatically pressing the overall gear preform.

21. The helical gear of claim 20 wherein the overall gear preform is hardened by heat treating the overall gear preform by induction heating.

22. The helical gear of claim 18 wherein the predetermined locations include at least one of a pitch line of the helical gear or a root line of the helical gear.

23. A method of manufacturing a gear, the method comprising:

fabricating an elastomeric gear core mold having the shape of a gear core preform;

filling the gear core mold with a powdered metal material;

subjecting the gear core mold to high pressure to form the gear core preform having the general geometry of the gear;

applying hardenable metallurgical material to the gear core preform at predetermined locations; and hardening the hardenable metallurgical material, to obtain the gear having a wear-resistant and high strength layer at the predetermined locations.

24. A method of manufacturing a helical gear, the method comprising:

fabricating an elastomeric gear core mold having the shape of a gear core preform;

filling the gear core mold with a powdered metal material;

forming the gear core preform having the general shape of the helical gear by cold isostatically pressing the gear core mold filled with the powdered metallurgical material;

positioning the gear core preform within an elastomeric mold having the specific shape of the helical gear;

filling the elastomeric mold at the predetermined locations with a hardenable powdered metallurgical material; and hardening the hardenable metallurgical material, to obtain the gear having a wear-resistant and high strength layer at the predetermined locations.

* * * * *